United States Patent [19]

Birdwell et al.

[11] Patent Number: 6,002,852
[45] Date of Patent: *Dec. 14, 1999

[54] METHOD AND SYSTEM FOR CONFIRMING RECEIPT OF DATA OPPORTUNISTICALLY BROADCAST TO CLIENT COMPUTER SYSTEMS

[75] Inventors: Kenneth J. Birdwell, Bellevue; Steven J. Fluegel, Redmond; Patrick C. O'Hanlon, Kirkland, all of Wash.

[73] Assignee: Microsoft Corporation, Redmond, Wash.

[*] Notice: This patent is subject to a terminal disclaimer.

[21] Appl. No.: 09/107,621

[22] Filed: Jun. 30, 1998

Related U.S. Application Data

[63] Continuation of application No. 08/502,706, Jul. 14, 1995, Pat. No. 5,793,973.

[51] Int. Cl.$^6$ ........................................... G06F 13/00
[52] U.S. Cl. ........................ 395/200.33; 395/200.57; 395/200.62
[58] Field of Search ................ 395/200.33, 200.62, 395/200.6, 200.67, 200.57; 370/312, 278

[56] References Cited

U.S. PATENT DOCUMENTS

| | | | |
|---|---|---|---|
| 4,507,781 | 3/1985 | Alvarez, III et al. | 370/266 |
| 4,845,658 | 7/1989 | Gifford | 395/200.47 |
| 4,888,727 | 12/1989 | Getson, Jr. et al. | 395/876 |
| 4,958,278 | 9/1990 | Meguro | 395/200.49 |
| 5,459,725 | 10/1995 | Bodner et al. | 370/390 |
| 5,467,341 | 11/1995 | Matsukane et al. | 370/253 |
| 5,519,704 | 5/1996 | Farinacci et al. | 370/402 |
| 5,572,678 | 11/1996 | Homma et al. | 395/200.57 |
| 5,706,435 | 1/1998 | Barbara et al. | 711/141 |
| 5,793,973 | 8/1998 | Birdwell et al. | 395/200.53 |

OTHER PUBLICATIONS

S. Deering, "Host Extensions for IP Multicasting," *Stanford University, Network Working Group, Request for Comments*: 1112, Obsoletes: RFCs 988, 1054, Aug. 1989, pp. 1–21.

*Primary Examiner*—Krisna Lim
*Attorney, Agent, or Firm*—Seed and Berry LLP

[57] ABSTRACT

A method and system for opportunistically downloading data from a server computer system to client computer systems. The server computer system has a point-to-point transmission mechanism for receiving data from each client computer system and has a broadcast transmission mechanism for broadcasting data to the client computer systems. Each client computer system has a broadcast receiver for receiving data broadcast by the broadcast transmission mechanism when the client computer system is in a receiving state. In a preferred embodiment, the server computer system selects data to be downloaded from the server computer system to the client computer systems, and broadcasts the selected data using the broadcast transmission mechanism. Each client computer system that is in the receiving state receives the broadcasted data and sends a confirmation that the client computer system has received the broadcasted data to the server computer system using the point-to-point transmission mechanism. Conversely, when a client computer system enters the receiving state, it sends a request to send the selected data to the server computer system using the point-to-point transmission mechanism. The server computer system receives the sent request and transmits the selected data to the client computer system that sent the request when the server computer system has not received confirmation that the client computer system that sent the request received the broadcasted data.

26 Claims, 14 Drawing Sheets

| Legend | |
|---|---|
| APP | Application |
| BDC | Broadcast Data Component |
| FTC | File Transfer Component |
| PTP | Point-to-Point Connection |

| Legend | |
|---|---|
| APP | Application |
| BDC | Broadcast Data Component |
| FTC | File Transfer Component |
| PTP | Point-to-Point Connection |

| Legend | |
|---|---|
| APP | Application |
| BDC | Broadcast Data Component |
| FTC | File Transfer Component |
| PTP | Point-to-Point Connection |

METHOD AND SYSTEM FOR CONFIRMING RECEIPT OF DATA OPPORTUNISTICALLY BROADCAST TO CLIENT COMPUTER SYSTEMS

This application is a continuation of U.S. patent application Ser. No. 08/502,706, filed Jul. 14, 1995, now issued as U.S. Pat. No. 5,793,973.

TECHNICAL FIELD

This invention relates generally to a method and system for transmission of data and, more specifically, to a method and system of opportunistically broadcasting data or sending the data by a point-to-point connection.

BACKGROUND OF THE INVENTION

As computer systems become more and more common in the workplace and in the home, the demand for transmission of information between these computer systems is increasing. Many computer system are interconnected through networks such as the Internet. Although each computer system connected to such a network can receive data from and send data to each other computer system, there are difficulties in using such networks. For example, because such computer systems are based on the telephone network, data transmission typically occurs at a relatively slow transmission rate. Also, when the same data is to be sent to multiple computer systems, the same data must be transmitted multiple times, that is, once for each computer system that is to receive the data.

When many computer systems need to receive the same data, some computer systems broadcast the data using satellite transmission. With satellite transmission, the same data can be sent only once and received by many computer systems. Although satellite transmission rates are very fast, there are several disadvantages of transmitting data by satellite. First, the cost of transmitting data by satellite can be prohibitive. Second, the cost of each computer system is increased because each computer system needs a satellite receiver. Third, if a computer system is not running at the time of transmission, the computer system cannot receive the transmission. Consequently, satellite transmissions are often repeated at periodic intervals to ensure that each computer system receives the transmission. Of course, the repeating of such transmissions can be expensive and may be unnecessary because all computer svstems, or least all those that care about the transmission, may have been running and actually received the data when it was first transmitted. Moreover, since such satellite transmissions typically only occur in one direction, there is generally no way of ensuring that all the intended recipient computer systems actually received a satellite transmission.

It would be desirable to have a transmission mechanism that would combine the advantages of the network computer systems and of satellite transmission, while minimizing their disadvantages.

SUMMARY OF THE INVENTION

The present invention provides method and system for opportunistically downloading data from a server computer system to client computer systems. The server computer system has a point-to-point transmission mechanism for receiving data from each client computer system and has a broadcast transmission mechanism for broadcasting data to the client computer systems. Each client computer system has a broadcast receiver for receiving data broadcast by the broadcast transmission mechanism when the client computer system is in a receiving state. In a preferred embodiment, the server computer system selects data to be downloaded from the server computer system to the client computer systems, and broadcasts the selected data using the broadcast transmission mechanism. Each client computer system that is in the receiving state receives the broadcasted data and sends a confirmation that the client computer system has received the broadcasted data to the server computer system using the point-to-point transmission mechanism. Conversely, when a client computer system enters the receiving state, it sends a request to send the selected data to the server computer system using the point-to-point transmission mechanism. The server computer system receives the sent request and transmits the selected data to the client computer system that sent the request when the server computer system has not received confirmation that the client computer system that sent the request received the broadcasted data.

Another aspect of the present invention provides a method and system for ensuring receipt of data that is broadcast from a server computer system and received by client computer systems. The server computer system has a broadcast transmission mechanism. Each client computer system has a broadcast receiver for receiving data broadcast by the broadcast transmission mechanism. The server computer system broadcasts the data using the broadcast transmission mechanism. Each client computer system uses the broadcast receiver to receive the broadcast data. Upon receiving the broadcasted data, each of client computer systems sends a confirmation from the client computer system to the server computer system through a transmission mechanism for sending data from client computer system to the server computer system.

DETAILED DESCRIPTION OF THE INVENTION

Figure 1:
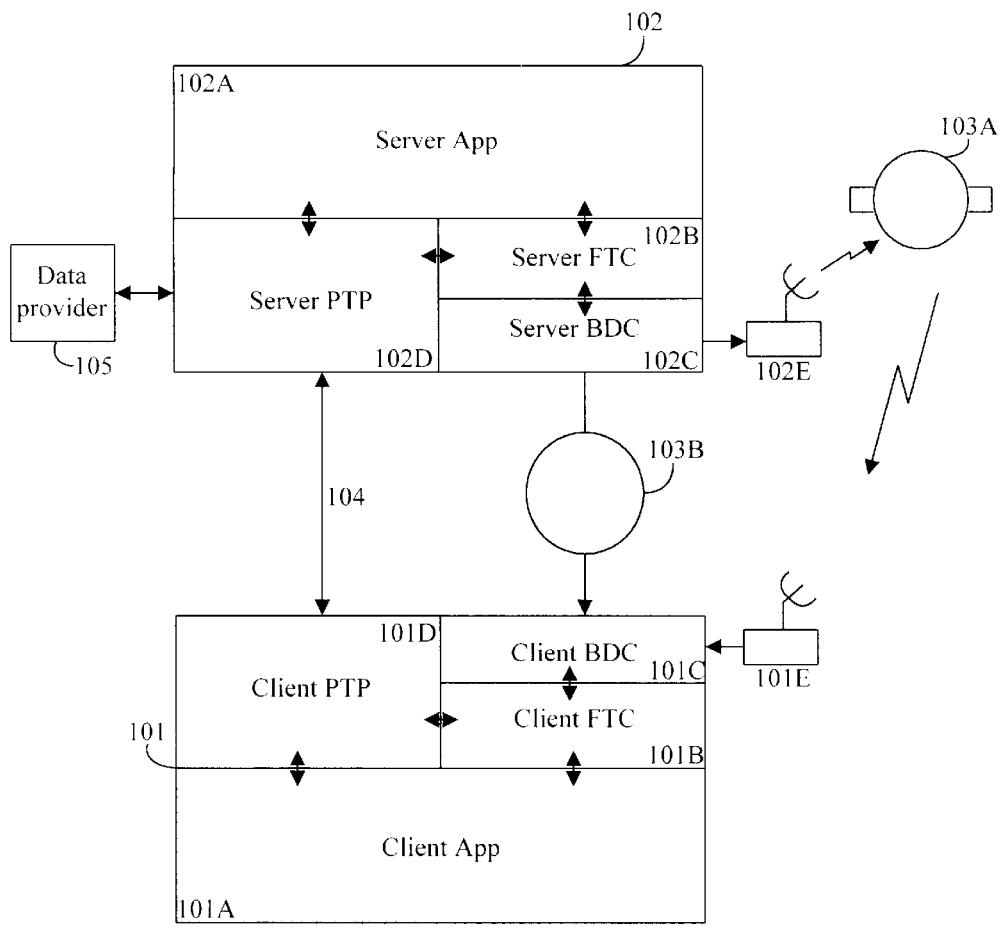
FIG. 1 is a block diagram illustrating the components of the opportunistic broadcast system.

The present invention provides a method and system for opportunistic broadcasting of data that is to be downloaded from a server computer system to client computer systems. In a preferred embodiment, a server computer system maintains a collection of data and can be connected to each client computer system through a point-to-point connection. The point-to-point connection can be via direct lines from each client computer system to the server computer system or via a routing network. Using the point-to-point connection, the server computer system can send data to and receive data from the client computer systems. However, if the same data is to be sent to multiple client computer systems using the point-to-point connection, the server computer system would send the same data multiple times: once for each client computer system. The server computer system also has a broadcasting transmission mechanism, such as a satellite, through which data can be broadcast to all client computer systems simultaneously. Each client computer system has a broadcast reception mechanism for receiving the broadcast data. Thus, when the same data is to be sent to multiple client computer systems, the server computer system can opportunistically broadcast the data and avoid sending the data once for each client computer system that is to receive the data. The server computer system sends the data via the broadcast transmission mechanism when it would be more efficient to do so.

In a preferred opportunistic broadcasting system of the present invention, the server computer system (server) receives a request from a client computer system (client) to download data from the server to the client computer system. The data is not only to be downloaded to the requesting client, but also to other clients who have not yet requested the data. The server may have received the data from a provider of data (e.g., contents of magazine) and a list of clients that are to receive the data. Alternatively, a client may have provided the data (e.g., electronic mail) that is to be sent to a list of clients. Also, the server may receive requests from many clients to download the same data. The server may group these multiple requests into a single download request that is to be downloaded to all the requesting clients. Before downloading the data to the requesting client, the server calculates certain transmission characteristics relating to the sending of the data to all the clients who are to receive the data using the point-to-point connection and using the broadcast mechanism. For example, the transmission characteristics may include transmission speed, cost of transmission, availability of the bandwidth for the transmission, and number of clients to whom the data is to be sent. The server uses these transmission characteristics to determine whether to transmit the data through the broadcast mechanism or through the point-to-point connection. For example, if the cost of transmitting through the broadcast mechanism is high and only two clients are to receive the data, then transmission through the point-to-point connection may be selected. Conversely, if the data is to be sent to 100 clients, then the cost of the 100 transmissions through the point-to-point connection may be higher than the cost of only one transmission through the broadcast mechanism. In this case, it may be cost-effective to broadcast the data. Thus, the opportunistic broadcasting system of the present invention selects the more efficient form of transmission based on the transmission characteristics.

When data is transmitted through the broadcast mechanism, not all the identified clients may be able to receive the broadcasted data. For example, a client computer system may be powered off at the time of the broadcast. The opportunistic broadcasting system uses a confirmation mechanism to ensure that each client eventually receives the data. The server tracks all those identified clients that have not yet confirmed receipt of the download data. When a client who has not confirmed receipt of the download data establishes a connection to the server through the point-to-point connection, the client may request the data to be downloaded. Typically, the server would send to the client a list of download data for which the client has not yet confirmed receipt. Using this list, the client can selectively request which data to download. To download the data again, the server again determines whether to transmit the data through point-to-point connection or through the broadcast mechanism. The server computer system makes this determination based on the transmission characteristics and the number of identified clients who have not yet confirmed receipt of the downloaded data. When the server re-transmits the download data for the clients who have not yet confirmed receipt, the server thus may again opportunistically broadcast the download data.

Many clients may be running at the time of broadcast, but may not be connected to the server at that time. These clients can receive and process the broadcasted data, but cannot confirm receipt of the broadcast. When such clients eventually connect to the server through the point-to-point connection, they can then confirm receipt of the download. Such clients would then typically request a list of data that the server has available to download to that client. However, since the client has confirmed receipt of some of the downloaded data, the list would not include that downloaded data. Thus, the client would have taken advantage of the broadcast of the data whose download was requested by another client.

FIG. 1 is a block diagram illustrating the components of the opportunistic broadcast system. The opportunistic broadcast system includes multiple client computer systems 101, a server computer system 102, broadcast transmission mechanisms 103A, 103B, point-to-point connection (PTP) 104, and a data provider 105. The client computer systems 101 include a client application (APP) 101A, a client File Transfer Component (FTC) 101B, a client Broadcast Data Component (BDC) 101C, a client PTP component 101D, and a broadcast receiver 101E. The server computer system 102 includes a server APP 102A, a server FTC 102B, a server BDC 102C, and a server PTP component 102D, and a broadcast transmitter 102E. The client computer systems can be connected to the server computer system through point-to-point connection 104. To broadcast data, the server computer system transmits the data to the broadcast mechanism 103A or 103B. In a preferred embodiment, the broadcast mechanism 103A is a satellite that receives transmissions from the broadcast transmitter 102E and broadcasts the transmissions to all broadcast receivers 101E simultaneously. Although the current preferred broadcast mechanism is satellite-based, the present invention can be used in conjunction with other types unidirectional broadcast mechanisms. For example, the computer systems may be connected to a cable television connection 103B, a high-speed fiber optic channel, or a radio-frequency channel on which data can be broadcast to all client computer systems simultaneously. The data provider computer system 105 provides data to the server for transmission to identified clients. The client APP and server APP represent application programs that request and receive download data. For example, the application program may be an electronic mail system. The client APP may represent the client portion of the mail system, and the server APP may represent the server portion of the mail system. The client APP and the server APP use the services of the client FTC and server FTC to download data. In a preferred embodiment, a client computer system can receive download data for a client APP even though the client APP is not currently executing and connected to the server APP. The client FTC and client BDC control the receiving of download data. If download data is received when the client APP is not executing, the data is stored until the client APP starts execution and retrieves the data.

Each transmission through the broadcast mechanisms includes information that identifies the client computer systems that are to receive the download data. Each client computer system is assigned a unique client identification number. The broadcast mechanism prefixes each transmission of download data with the client identifications of those client computer systems that are to receive the download data.

All client computer systems can receive all broadcasts of download data. However, only those client computer systems whose client identifications are included in the transmission will actually store and process the download data. The broadcast mechanism preferably uses an encryption mechanism to ensure that only the client computer systems to which the download data is being sent can store and process the download data. Each client computer system is assigned a public encryption key and a private decryption key. The server uses the public encryption key of the client to encrypt data that is to be sent to the client. Although all the clients can receive the encrypted data, only that client to which the data is directed can decrypt the data using its private decryption key.

The preferred broadcast mechanism uses "addresses," rather than client identification numbers when addressing a broadcast. Each client may be assigned its own address; in addition, a group of clients may be assigned to the same address. When a broadcast is addressed, each client that is assigned to that address can receive the download data. The broadcast mechanism need not be aware of the distinction between an address assigned to a single client or assigned to multiple clients. However, the server APP is preferably aware of each client that is assigned to an address. The server APP tracks whether all the clients assigned to an address have confirmed receipt of download data directed to the address. To ensure that the data sent to an address is received only by those clients who are assigned to that address, the server generates a public encryption key and a private decryption key for that address. Since each client assigned to an address needs access to the private decryption key to decrypt data sent to that address, the server sends the private decryption key to each assigned client. To send a private decryption key for an address to a client securely, the server encrypts the private decryption key using the public encryption key of the client before sending. Upon receiving the encrypted private decryption key of the address, the client uses its own private decryption key to decrypt the private decryption key of the address. In this way, only those clients that are assigned to an address have the private decryption key for that address. If new clients are assigned to the address, then the private encryption key for that address is sent to those new clients. If, however, clients are unassigned from the address, then a new public encryption key and private decryption key for the address is generated. The new private decryption key is sent to each client that is still assigned to the address. When data is sent to the address, it is encrypted with the new public encryption key.

In this way, the client that was unassigned from the address can no longer decrypt the data for that address.

In one embodiment, the preferred broadcast mechanism allows addresses to be dynamically assigned. To allow this dynamic assignment, each client is assigned to a global address. The server broadcasts new address assignments on the global address. The broadcast includes the new address and the client identifications of each client assigned to the new address. Since each client processes data for the global address, each client will know whether it is assigned to the new address. Those clients that are assigned to the new address can then register to receive data on the new address. The assigned clients would also be sent a private decryption key for the new address. Alternatively, each client that is assigned to the new address can individually be notified using the client's own address rather than the global address.

Figure 2:
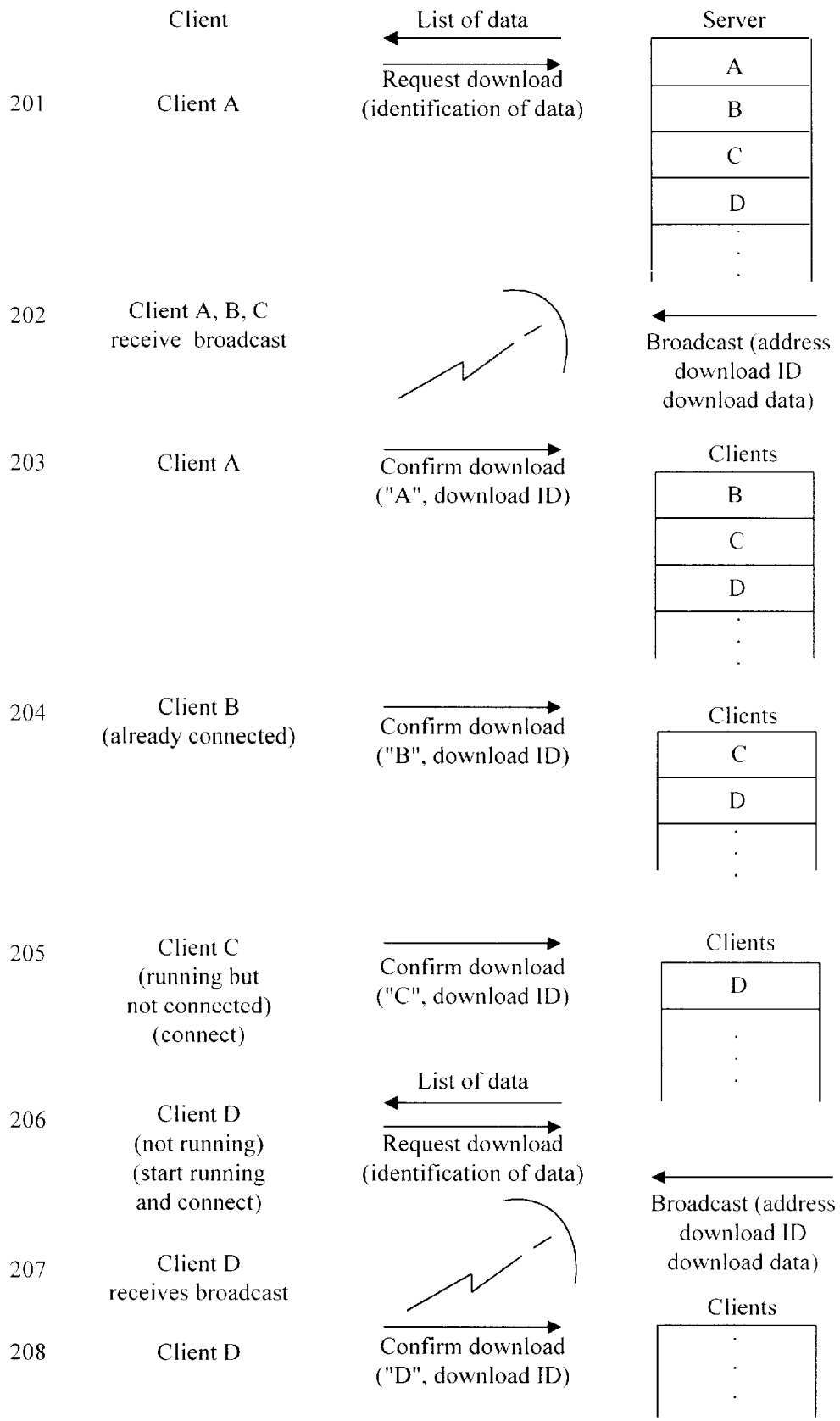
FIG. 2 is a diagram illustrating the operation of the opportunistic broadcasting system.

FIG. 2 is a diagram illustrating the operation of the opportunistic broadcasting system. In this example, a client computer system receives a list of available data that the server computer system is prepared to download to the client computer system. In response, the client requests that the data be downloaded from the server computer system. The data that client A is requesting is also to be sent to client B, client C, client D, etc. In this example, the server opportunistically broadcasts the data to client A so that the other clients may also receive the data. As shown in step 201, client A sends a "request download" message to the server through the point-to-point connection. The message includes the identification of the data. When the server receives the "request download" message, the server recognizes that multiple clients are to receive the data and determines whether the data to be downloaded should be broadcast or sent through the point-to-point connection. In this example, the server decides to broadcast the data. The server first broadcasts to the global address that data will be transmitted on the identified address for clients A, B, C, D, etc. As shown in step 202, the server then broadcasts the data on the identified address, and the data is received by clients A, B, and C who were assigned to that address. The server assigns a download identification for the broadcast, which is transmitted with the broadcast. The clients who receive the broadcast use this download identification to confirm receipt of the download data. At the time of the broadcast, clients A and B were connected to the server, but client C was not connected. The computer system of client C, however, was running and thus able to receive the broadcast. The computer system of client D was not running and thus was unable to receive the broadcast. As shown in step 202, once client A receives the broadcast, it confirms receipt of the download by sending a "confirm download" message to the server. Upon receiving the "confirm download" message from client A, the server removes client A's identification from the list of clients who have not yet confirm the receipt of the download data. As shown in step 204, client B, who also received the download data and is connected to the server, sends a "confirm download" message to the server. Upon receipt of the "confirm download" message from client B, the server removes client B's identification from the list of clients who have not yet confirmed receipt of the download. As shown in step 205, client C was running, but was not connected to the server at the time of the broadcast. Although client C was not connected to the server, client C was able to process the data it received. When client C subsequently connects to the server, client C sends a "confirm download" message to the server. Upon receipt of the "confirm download" message, the server removes client C's identification from the list of clients who have not yet confirmed receipt of the download data. This confirmation is referred to as a "delayed confirmation" because although client C received the download data, it delayed sending the "confirm download" message until it was connected to the server through the point-to-point connection. As shown in step 206, client D eventually starts running and then connects to the server. Client D requests the server for a list of available data that is to be sent client D. The server determines that client D has not yet confirmed receipt of the download because its client identification is still in the list of clients. The server sends an indication to client D that it has this data for it. To download the data, client D then sends a "request download" message to the server. At that point, the server determines again whether the data to be downloaded should be broadcast or sent by the point-to-point connection to client D. In this example, the server decides to re-broadcast the data. As shown in step 207, when the data is re-broadcast the server uses the global address to identify the address to which the data will be sent and the clients who are to receive the data, and then broadcasts the data using the same download identification. Client D then receives the broadcast. As shown in step 208, client D sends a "confirm download" message to the server. The server removes client D from the list of clients. If a client had already received that download data, then it would disregard the re-broadcast. However, if a client had not received the initial broadcast, it would receive the re-broadcast, if running, and confirm receipt when it is connected to the server. Thus, the server can ensure that all the clients assigned to the address will eventually receive the download data or, at least, track those clients who have not yet confirmed receipt of the download data. Furthermore, the server can broadcast the data so that clients who have not yet requested the data to be downloaded can receive the data and avoid the overhead of requesting and retransmitting.

Figure 3:
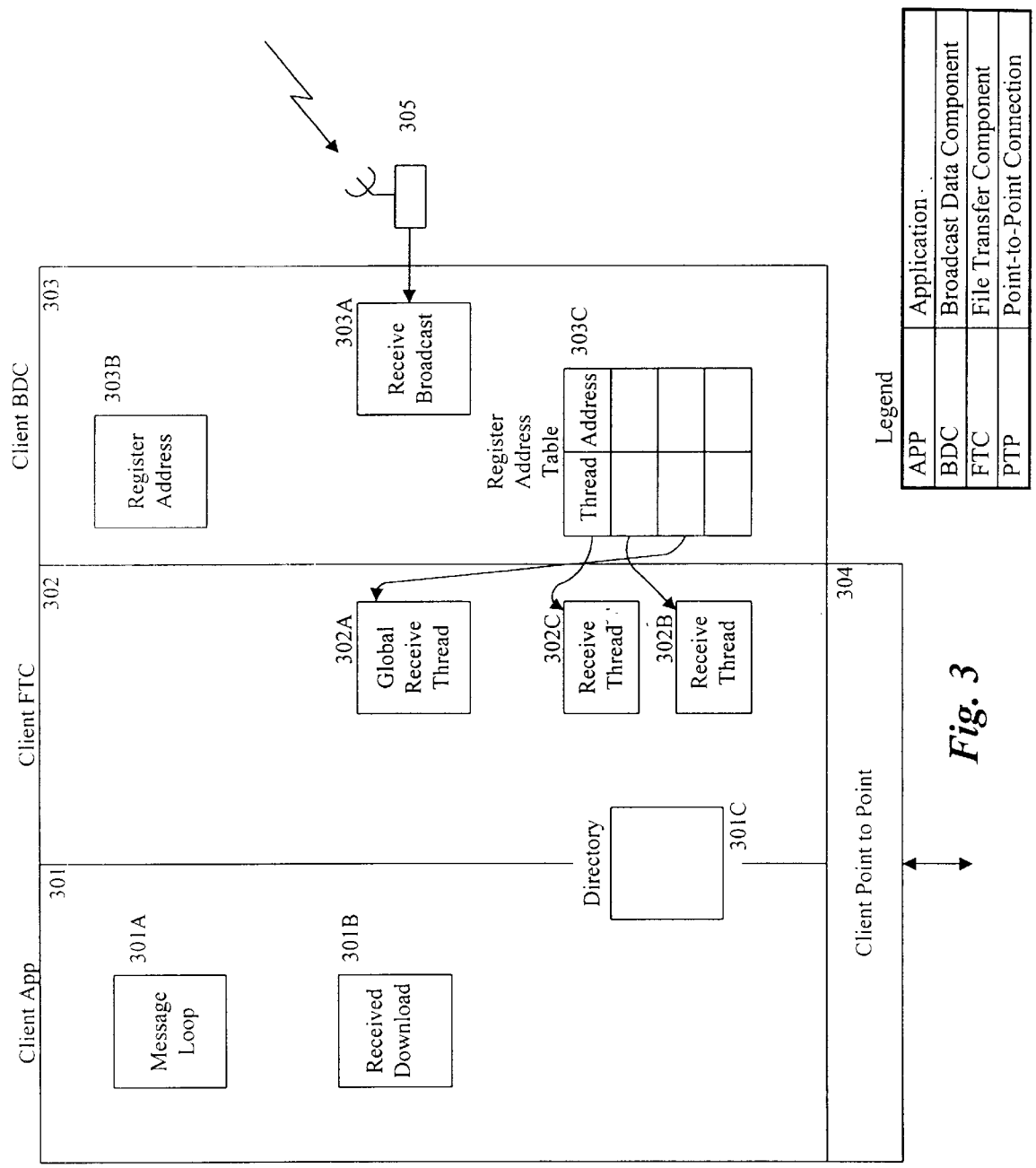
FIG. 3 is a block diagram illustrating the client APP, the client FTC and the client BDC.

FIG. 3 is a block diagram illustrating the client APP, the client FTC, and the client BDC. The client APP represents a client application program that uses the services of the client FTC. The client APP receives a list of available data that may be downloaded, requests certain data be downloaded, receives the downloaded data, and confirms receipt of the downloaded data. During installation, the client APP registers the types of data that it would like to receive and designates the file directory in which it would like the data stored. The client FTC receives downloaded data, stores the data in the designated directory, and notifies the client APP that data has been received. The client BDC receives and decrypts the downloaded data for addresses that have been registered with it and notifies an appropriate thread of the client FTC. The client APP 301 contains a Message Loop 301A, a Received Download routine 301B, and a directory 301C. The Message Loop 301A receives messages sent to the client FTC and distributes the messages to the appropriate routines for handling. If broadcasts were received when the client APP was not connected to the server APP, then, upon connection, the client APP sends a "confirm download" (i.e., a delayed confirmation) message to the server APP for each download data received. The Received Download routine 301B retrieves data from the directory, processes the data in the directory, and saves the download identifications for later confirmation to the server APP.

The client FTC contains Receive threads 302A, 302B, and 302C. The Global Receive thread 302A receives data for the global address. Certain data that is sent on the global address indicates that the client APP is to receive data on another address. When such data is received, the Global Receive thread 302A starts another Receive thread 302B and 302C for receiving the data on that other address. These Receive threads are invoked by the client BDC whenever data for a download is received for an address that the client is assigned to and that the client is registered to receive. The Receive threads 302B and 302C store the data in a file in the directory designated by the client APP.

The client BDC 303 contains a Received Broadcast routine 303A, a Register Address routine 303B, and an Address table 303C. The client FTC invokes the Register Address routine 303B to register any addresses to which the client is assigned and for which the client wishes to receive broadcasts. The Receive thread associated with the address is invoked when broadcast data is received for the registered address. The Register Address routine stores the address and the identification of the Receive thread in the Address table. The Received Broadcast routine is invoked by a broadcast device driver to process any broadcasts that are received through broadcast receiver 305. The Received Broadcast routine determines whether the broadcast address corresponds to any address in the Address table. If the Received Broadcast routine determines that there is a correspondence, then the Received Broadcast routine invokes the identified Receive thread to process the received data.

Figure 4:
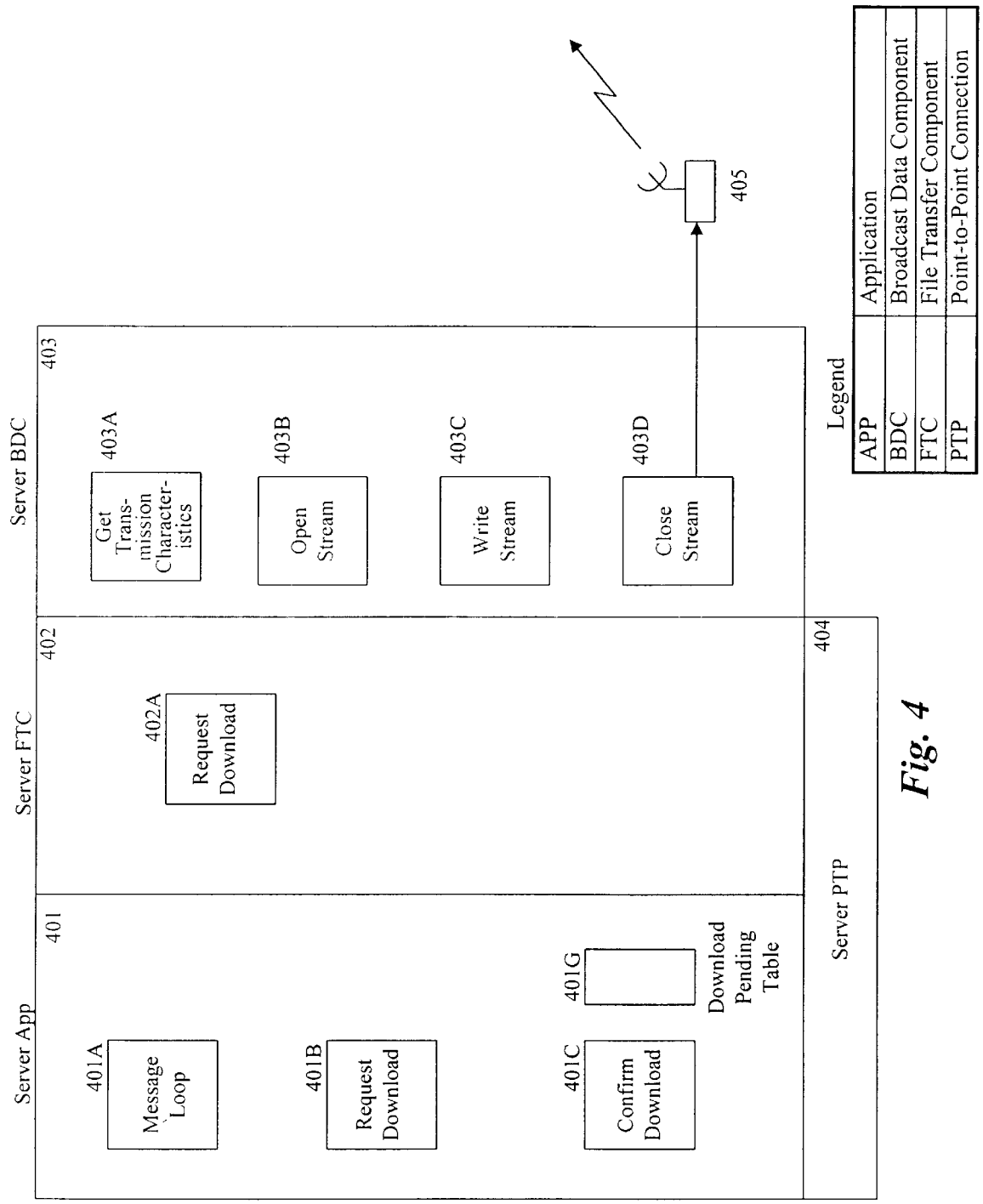
FIG. 4 is a block diagram illustrating the server APP, server FTC, and the server BDC.

FIG. 4 is a block diagram illustrating the server APP, server FTC, and the server BDC. The server APP 401 contains a Message Loop 401A, a Request Download routine 401B, a Confirm Download routine 401C, and a Download Pending table 401G. The Message Loop 401A receives each of the messages sent to the server APP from a client APP through the server PTP 404 and invokes the appropriate routine for handling the message. The Request Download routine 401B processes "request download" messages. The Confirm Download routine 401C processes "confirm download" messages. The Download Pending table 401G identifies those downloads for which not all of the clients have yet confirmed receipt of the download data. The server APP adds an entry to this table for each client that is to receive the download.

The server FTC contains the Request Download routine 402A for processing download requests from the server APP.

The server BDC 403 contains a Get Broadcast Transmission Characteristics routine 403A, an Open Stream routine 403B, a Write Stream routine 403C, and a Close Stream routine 403D. The Get Broadcast Transmission Characteristics routine retrieves various characteristics for the broadcast of the download data. The stream routines control the broadcasting of the download data through the broadcast transmission mechanism 405.

Client Routines

FIGS. 5–10 are flow diagrams of the routines of the client computer system. Upon installation of the client APP, the client APP designates in which directory its downloaded data is to be stored and which types of data it wants downloaded. For example, an electronic mail application would want to download electronic mail type data, but not, for example, weather related data.

Figure 5:
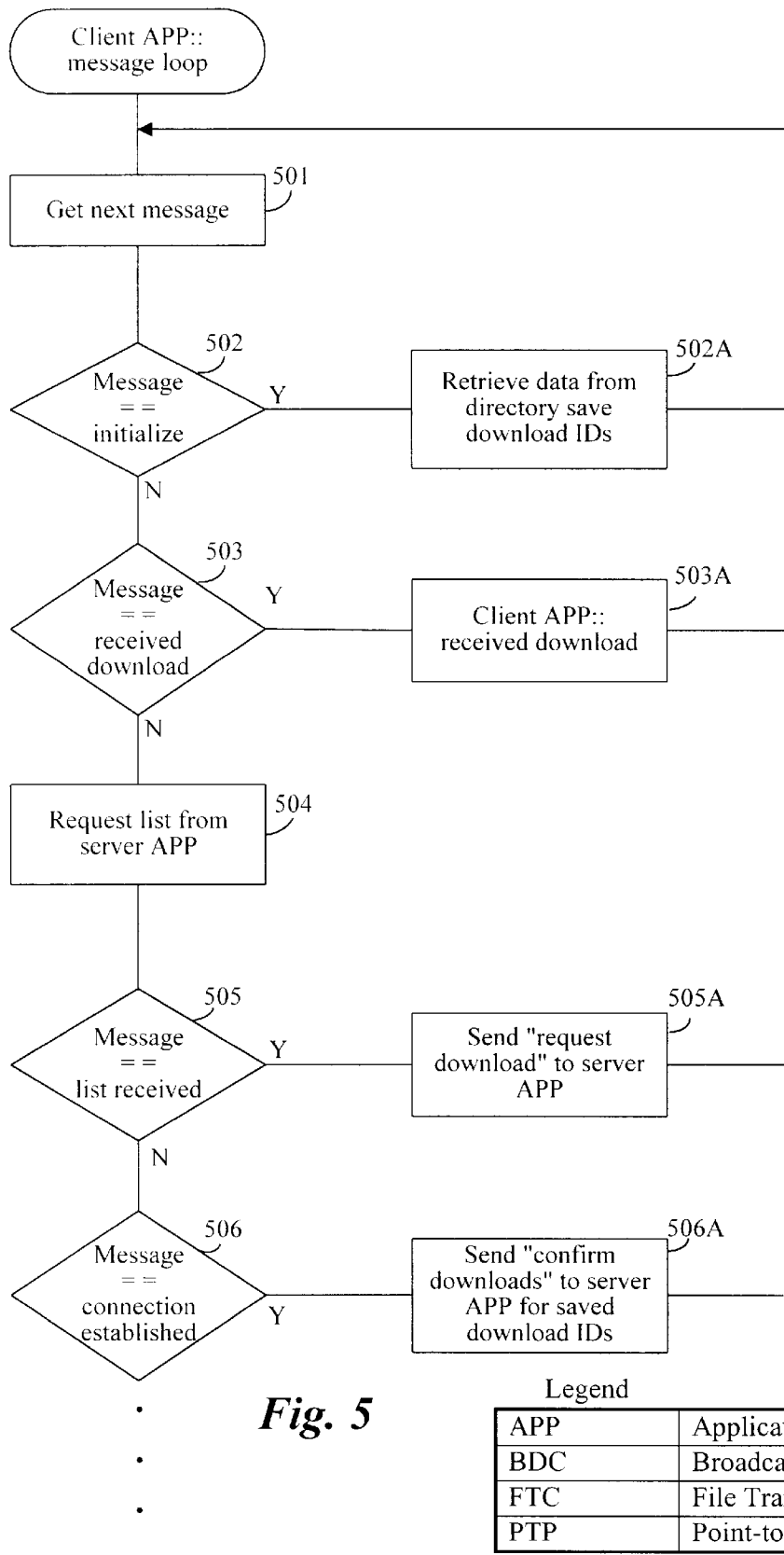
FIG. 5 is a flow diagram of the Message Loop of the client APP.

FIG. 5 is a flow diagram of the Message Loop of the client APP. The Message Loop receives messages from the server APP and the client FTC, confirms downloads, and processes download data. The client FTC receives the messages: "initialize," "received download," "list received," and "established connection." The "initialize" message indicates that the client APP has just started running. The "received download" message indicates that the client FTC has just received a download for the client APP. The "list received" message indicates that a list of data that may be downloaded has been received from the server APP. The "established connection" message indicates that the client APP has established a connection with the server APP. Although many of the routines are described as using a message passing mechanism, one skilled in the art would appreciate that techniques of the present invention could also be implemented using a procedure call or remote procedure call mechanism. In step 501, the Message Loop retrieves the next message. In steps 502, if the message is "initialize," then the Message Loop continues at step 502A, else the Message Loop continues at step 503. In step 502A, the Message Loop processes the data in the directory that was downloaded while the client APP was not running and saves the download identification of that data for later confirmation. In step 503, if the message is "received download," then the Message Loop invokes the Received Download routine of the client APP in step 503A. In step 504, the Message Loop requests a list of the available data from the server APP by sending a "request list" message to the server APP. In step 505, if the message is "list received," the Message Loop sends a "request download" message to the server APP for each data download it wants to receive in step 505A. In step 506, if the message is "established connection," then the Message Loop sends a "confirm download" message to the server APP for each download identification that was saved while the client APP was not connected to the server APP.

Figure 6:
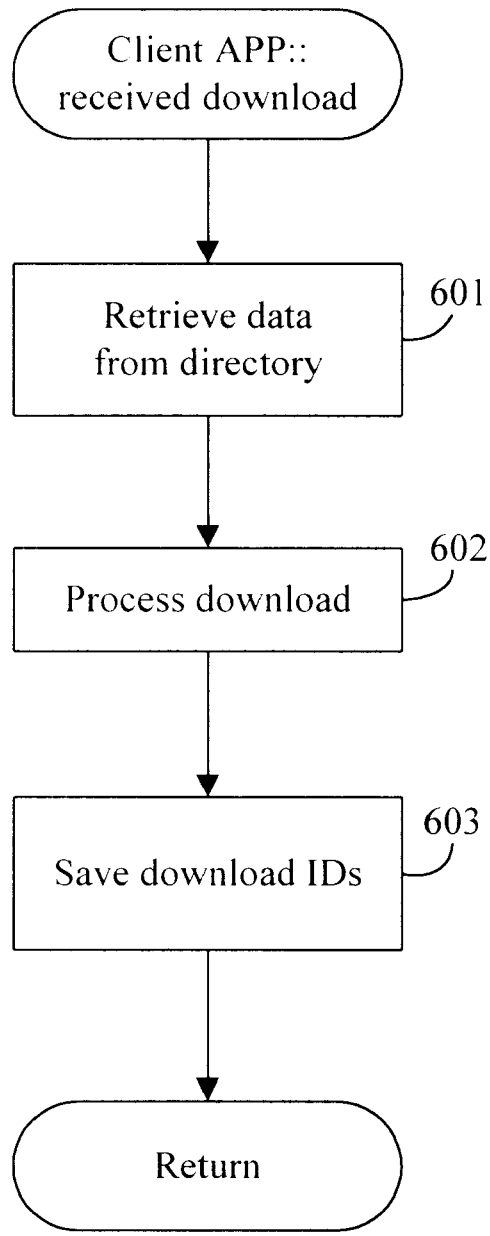
FIG. 6 is a flow diagram of the Received Download routine of the client FTC.

FIG. 6 is a flow diagram of the Received Download routine of the client APP. The Received Download routine retrieves the downloaded data from the directory, processes the data, and saves the download identification so that when a connection is established its receipt can be confirmed. In step 601, the Received Download routine retrieves the file from the designated directory. In step 602, the Received Download routine processes the retrieved file. In step 603, the Received Download routine saves the download identification for later confirmation.

Figure 7:
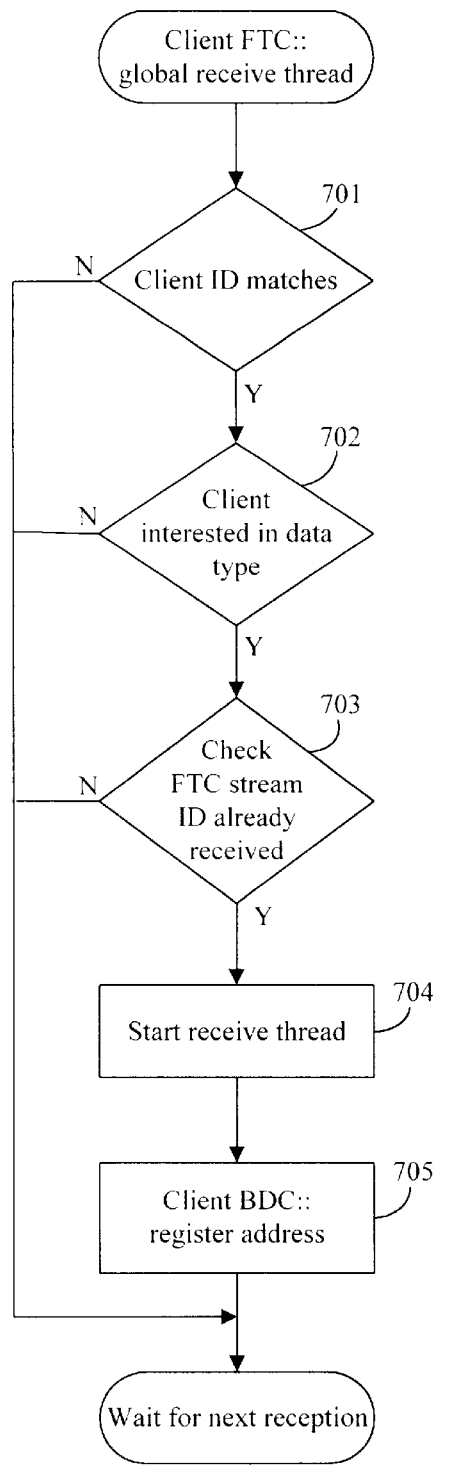
FIG. 7 is a flow diagram of the Global Receive thread of the client FTC.

FIG. 7 is a flow diagram of the Global Receive thread of the client FTC. The Global Receive thread receives all the data sent on the global address. One type of global data indicates that data is to be transmitted to certain clients on another address. The global data includes what type of data will be transmitted, the identification of the clients to receive the data, and the identification of the address to which the data will be transmitted. If the client is identified, if the client APP has registered to receive that type of data, and if the client FTC has not already received the data, then the Global Receive thread sets up a mechanism for receiving the data on the identified address. In step 701, if the client matches a identified client in the global data, then the thread continues at step 702, else the thread disregards the data. In step 702, if the client APP has register to receive that type of data, then the thread continues at step 703, else the thread disregards the data. In step 703, if the data has already been received, then the thread continues at step 704, else the thread disregards the data. This happens, for example, when the downloaded data is re-broadcast because some addressee client computer systems have not confirmed receipt of the last broadcast. In steps 704, the Global Receive thread starts a thread to receive the data to be transmitted. In step 705, the Global Receive thread registers the new address with the client BDC.

Figure 8:
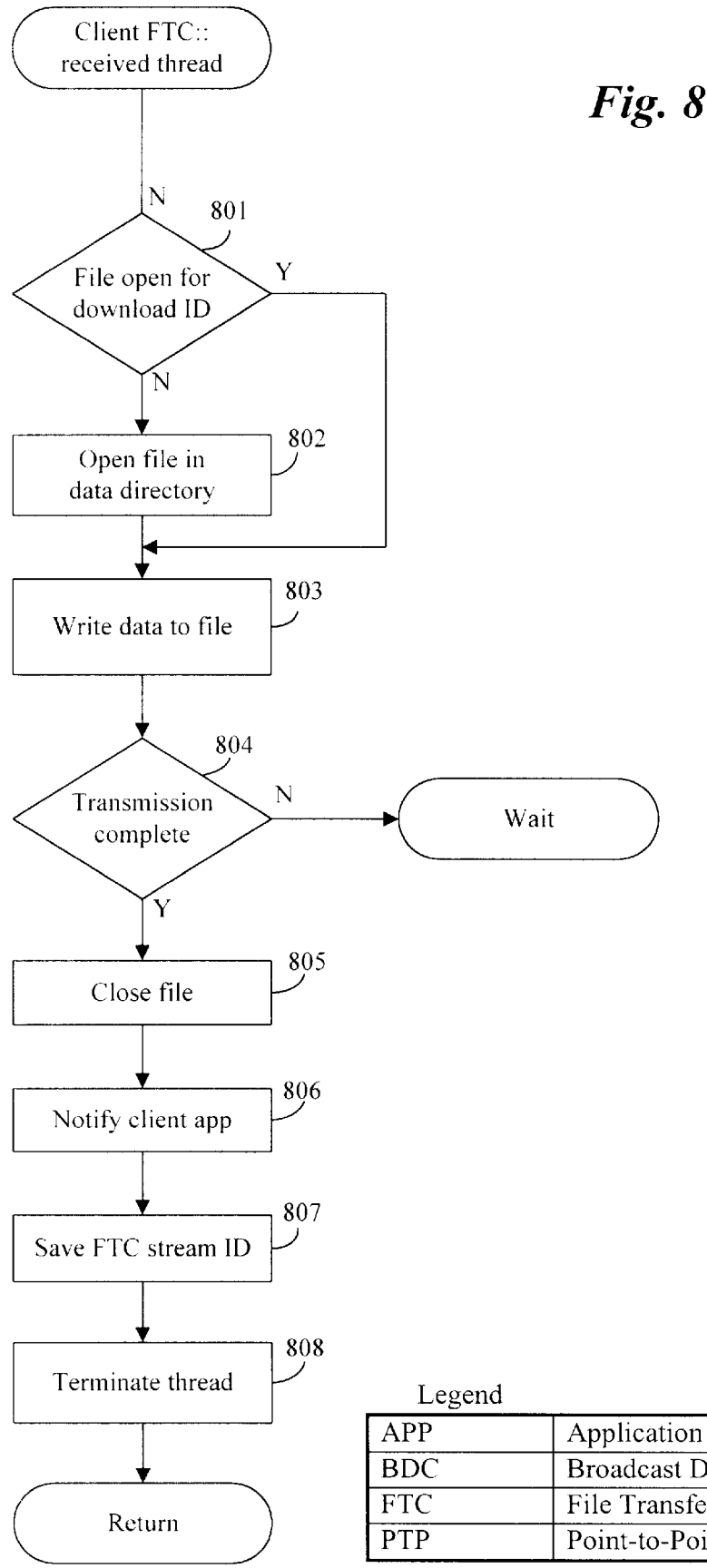
FIG. 8 is a flow diagram of a sample Receive thread for the client FTC.

FIG. 8 is a flow diagram of a sample Receive thread for the client FTC. The Receive threads handle the storing of streams of download data for a particular address. In step 802, if a file has already been opened for the download data, then the thread continues at step 804, else the thread opens a file in the designated directory for the client APP to receive the download data in step 803. In step 804, the Receive thread writes the received data to the open file. In step 805, if the download has been completed, then the thread continues at step 804, else the thread waits for the next transmission for that download. In step 806, the Receive thread closes the file. In step 807, the Receive thread sends a "received download" message to the client APP, if running, to notify the client APP that data has been downloaded for it. In step 808, the Receive thread saves the identification of the data it received so that the Global Receive thread will disregard the data if it is re-broadcasted. In step 808, the Receive thread removes its corresponding address from the Address table and terminates.

Figure 9:
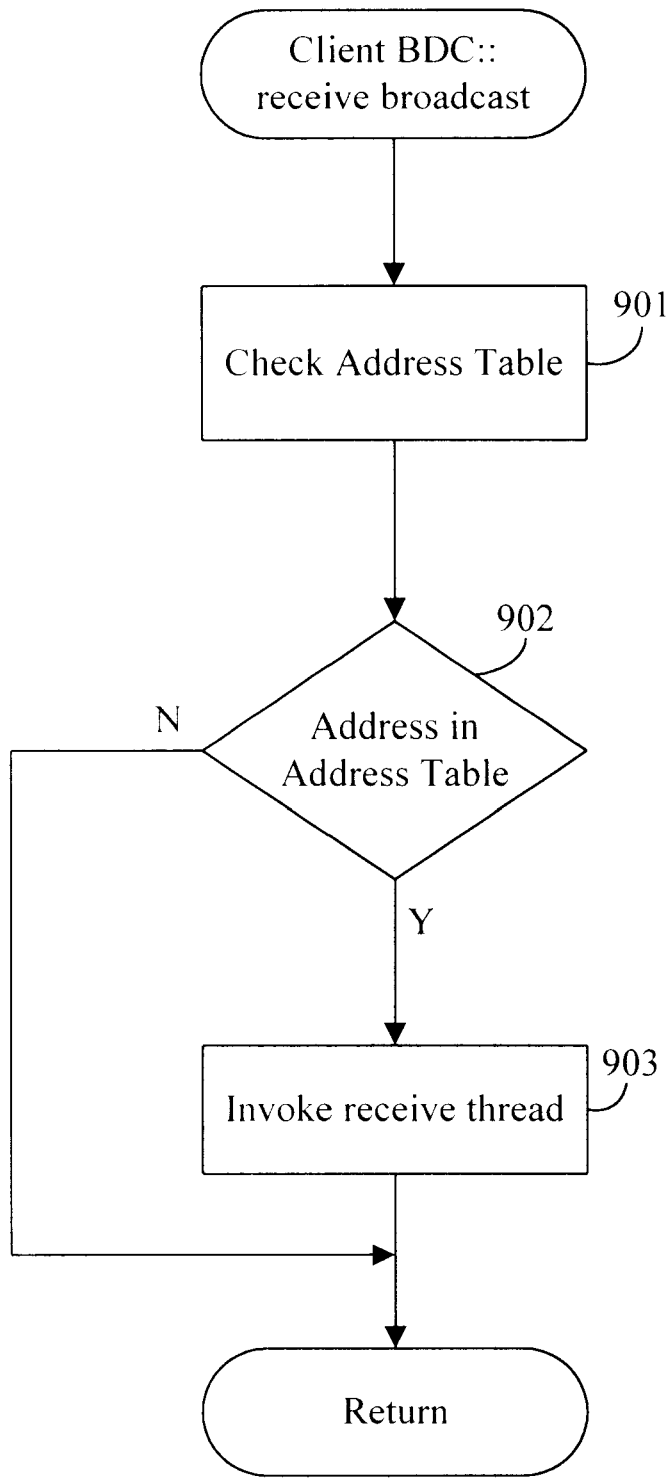
FIG. 9 is a flow diagram of the Receive Broadcast routine of the client BDC.

FIG. 9 is a flow diagram of the Receive Broadcast routine of the client BDC. The Receive Broadcast routine is invoked by the broadcast receiver device driver each time a broadcast is received. In step 901, the Receive Broadcast routine checks the Address table to determine if the broadcast is directed to an address for which the client has registered to receive broadcasts. In step 902, if the address of the broadcast is in the Address table, then the routine continues at step 903, else the routine returns. In step 903, the Receive Broadcast routine invokes the Receive thread identified in the Address table and returns.

Figure 10:
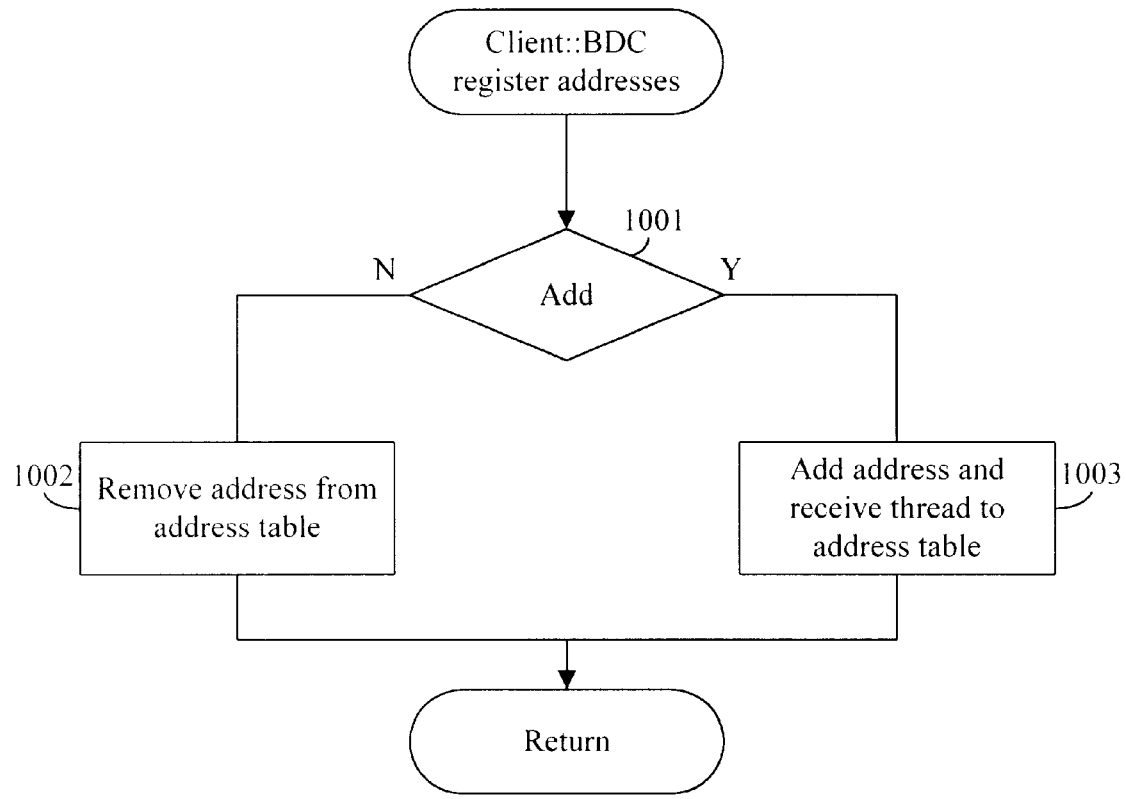
FIG. 10 is a flow diagram of the Register Address routine of the client BDC.

FIG. 10 is a flow diagram of the Register Address routine of the client BDC. The Register Address routine is passed the address for which the client wants to receive data (or stop receiving data) and an identification of a Receive thread to handle the stream of broadcast data. In step 1001, if the routine is invoked to add an address, then the routine continues at step 1003, else the routine continues at step 1002. In step 1002, the Register Address routine removes the passed address from the Address table and returns. In step 1003, the Register Address routine adds the passed address and the identification of Receive thread to the Address table and returns.

Server Routines

Figure 11:
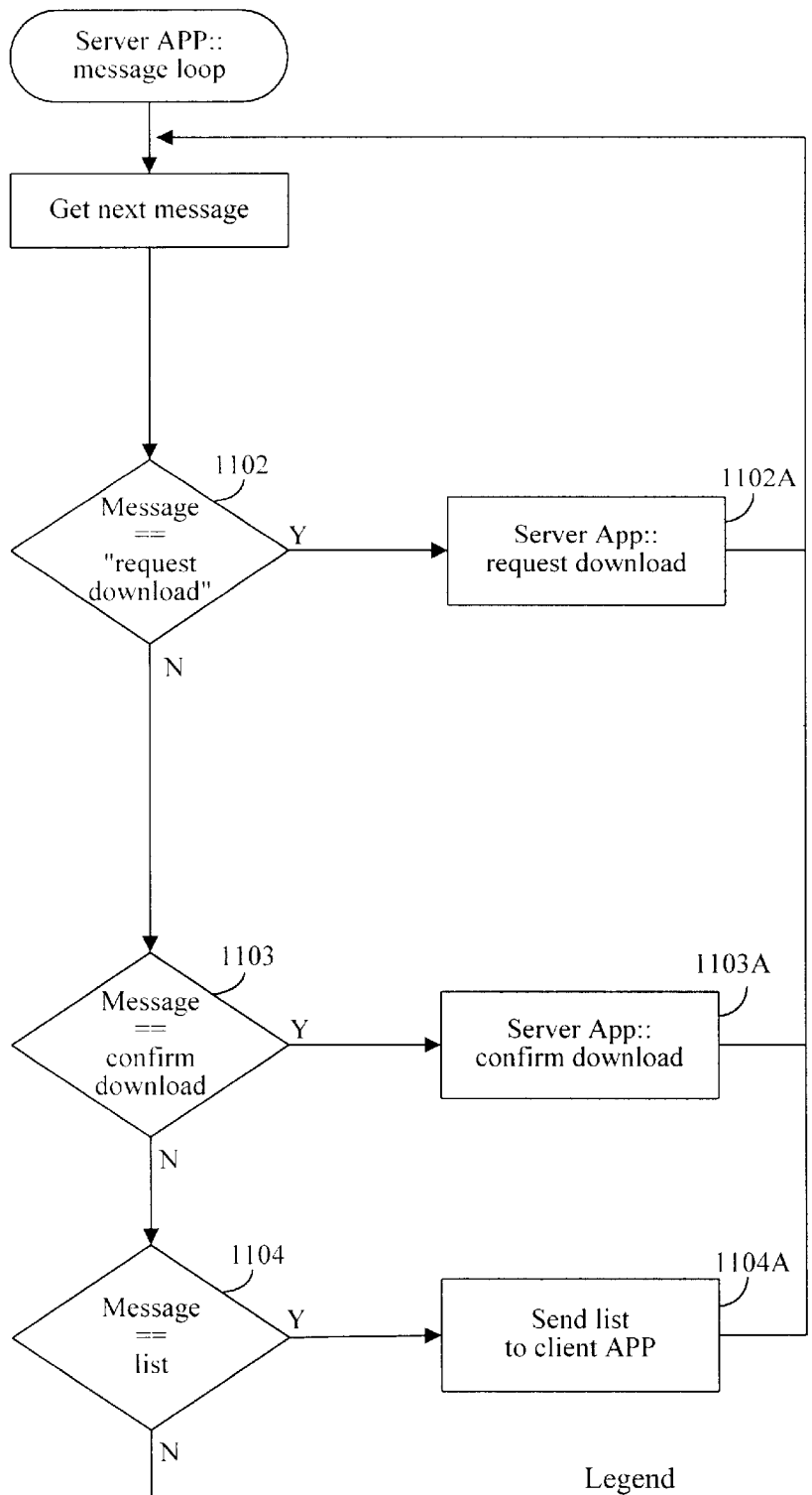
FIG. 11 is a flow diagram of the Message Loop of the server APP.

FIGS. 11–14 are flow diagrams of the routines of the server. FIG. 11 is a flow diagram of the Message Loop of the server APP. The server APP receives from the client APP three messages: "download request," "confirm download," and "request list." The "download request" message is a request to download data to the client APP. The "confirm download" message indicates that the client APP has received the data. The "request list" message indicates that the client APP wants to receive the list of available data that the server has yet to download to the client APP. The Message Loop calls the appropriate routine to handle the message. In step 1101, the Message Loop retrieves the next message. In steps 1102–1104, the Message Loop decodes the message. In steps 1102A–1104A, the Message Loop processes the message. In step 1104A, the server APP retrieves the list of available data to download for the client APP from the Download Pending table and sends the list to the client APP.

Figure 12:
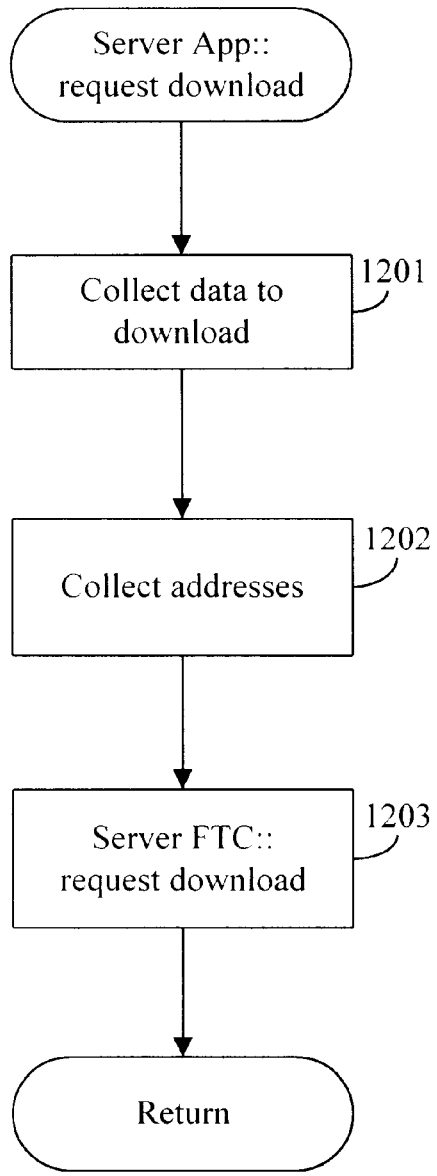
FIG. 12 is a flow diagram of the Request Download routine of the server APP.

FIG. 12 is a flow diagram of the Request Download routine of the server APP. In step 1201, the routine collects the data to be downloaded as indicated in the message received from the client APP. In step 1202, the routine determines the clients to which the data is directed and that have not yet confirmed receipt as indicated by the Pending Download table. In step 1203, the routine invokes the Request Download routine of the server FTC and returns.

Figure 13:
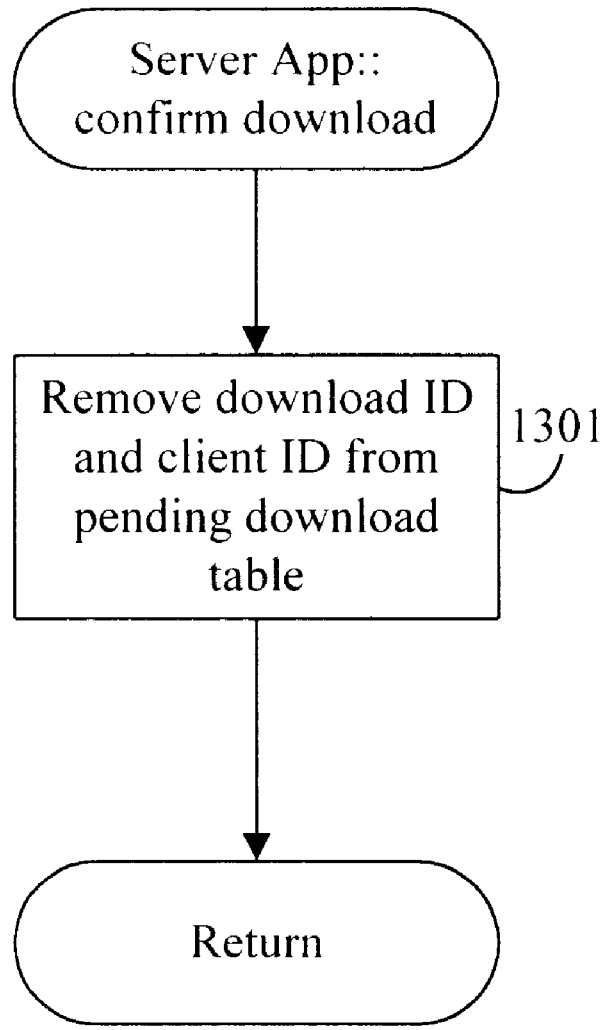
FIG. 13 is a flow diagram of the Confirm Download routine of the server APP.

FIG. 13 is a flow diagram of the Confirm Download routine of the server APP. In step 1301, the routine removes the client identification from the Pending Download table for the download identification for which the client confirmed receipt and returns.

Figure 14:
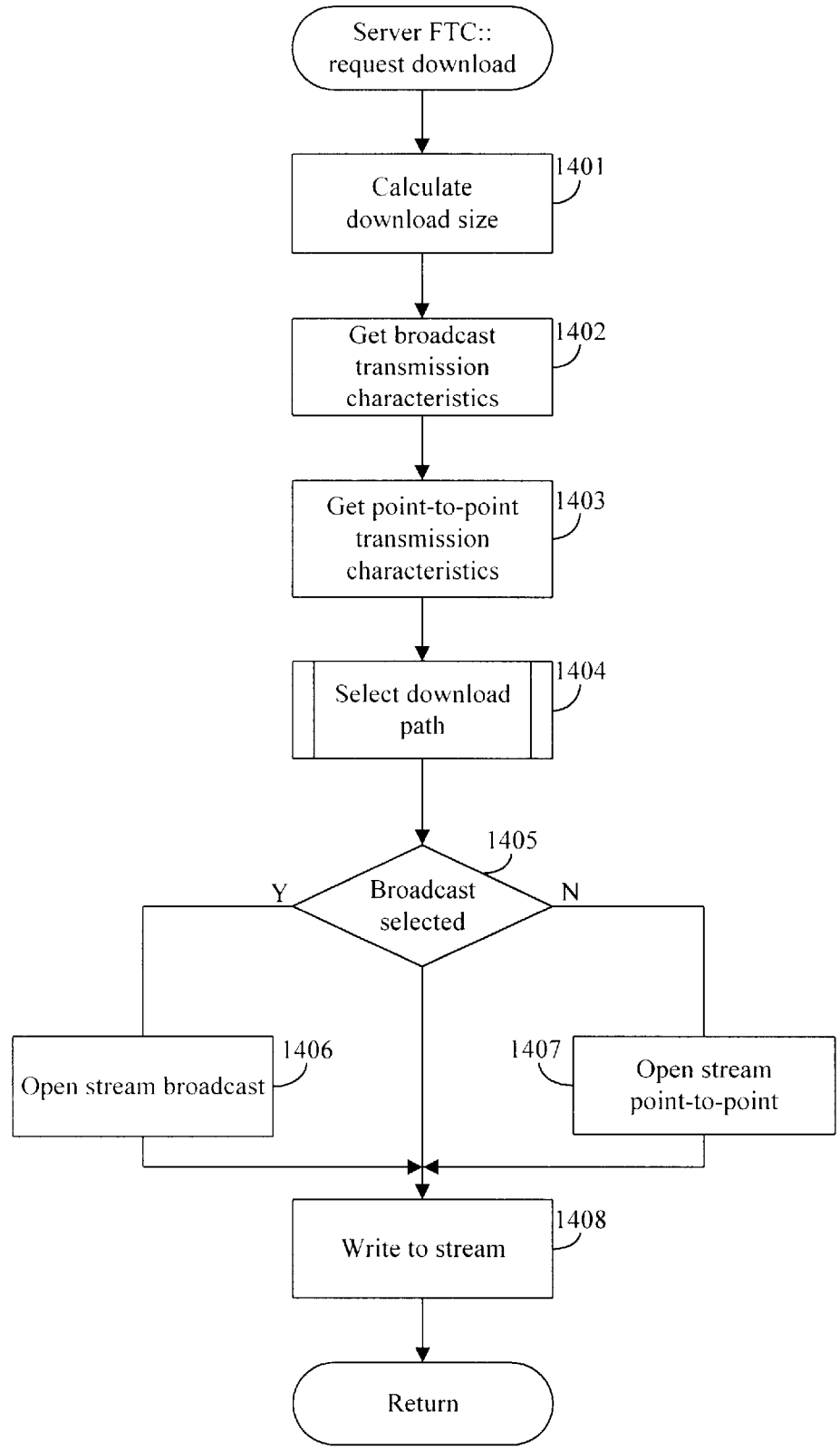
FIG. 14 is a flow diagram of the Request Download routine of the server FTC.

FIG. 14 is a flow diagram of the Request Download routine of the server FTC. The Request Download routine determines which transmission path to use and transmits the download data. Alternatively, this routine could be passed an indication as to whether the data should be sent by the point-to-point or should be broadcasted. In step 1401, the Request Download routine determines the size of the data to be downloaded. In step 1402, the Request Download routine invokes a routine provided by the server BDC to determine the transmission characteristics for the broadcast. In step 1403, the Request Download routine invokes a routine provided by the server point-to-point component to determine the transmission characteristics of the point-to-point transmission. In step 1404, the Request Download routine evaluates the transmission characteristics to select either the broadcast transmission mechanism or point-to-point connection. In step 1405, if broadcast mechanism is selected, then the routine continues at step 1406, else the routine continues at step 1407. In step 1406, the Request Download routine opens a broadcast stream. In step 1407, the Request Download routine opens a point-to-point stream. In step 1408, the Request Download routine writes the download data to the open stream and returns.

In one embodiment of the present invention, certain transmission characteristics of a broadcast transmission are estimated based on bandwidth that was unused in a previous time interval. For example, if 10 K bytes per second of bandwidth was unused on average in the last 10 seconds and a request for transmission characteristics specifies an 1 M byte transmission, then the time of transmission is estimated as 100 seconds (i.e., 1 M bytes/10 K bytes per second). Other transmission characteristics may be based on cost. For example, a request for transmission may indicate that the transmission is to occur during non-prime time or during prime time. The transmission characteristics of the point-to-point connection can be determined in an analogous manner. For example, if the point-to-point connection is a 14 K baud phone line, then an 1 M byte transmission may take approximately 570 seconds (i.e., 1 M byte * 8 bits per byte/14 K bits per second). Similar costs would apply to prime and non-prime time point-to-point transmissions. Once the transmission characteristics are received, the server FTC determines the more efficient way to transmit the data. The server FTC would take into consideration the speed of transmission, cost of transmission, number of recipients, and the priority of the transmission.

Although the present invention has been described in terms of a preferred embodiment, it is not intended that the system be limited to this embodiment. One skilled in the art would appreciate that present invention can be used in conjunction With file servers, database server, or electronic mail servers. Thus, the download data can represent a file, a query from the database, or an electronic mail message. In addition, the present invention can be used for the distribution of computer programs and of real time data such as stock prices and weather information. Also, in an alternate embodiment, the server FTC, rather than the server APP, could track clients who have not yet confirmed receipt and periodically retransmit the data. Modifications within the spirit of the system will be apparent to those skilled in the art. The scope of the present invention is defined by the claims that follow.

We claim:

1. A method in a client computer system for confirming receipt of data broadcast by a server computer system, the broadcasted data being broadcasted using a broadcast transmission mechanism for transmitting data unidirectionally from the server computer system to the client computer systems, the method comprising:

when the client computer system does not have a connection established with the server computer system, receiving the broadcasted data; and
storing an indication that the broadcasted data has been received; and when the client computer system later establishes a connection with the server computer system,
checking for presence of the stored indication that the broadcasted data has been received; and
when the stored indication is present, sending a confirmation that the client computer system received the broadcasted data to the server computer system using the established connection so that the server computer system can track those client computer systems that have sent confirmations and can send the broadcasted data to those client computer systems that have not sent confirmations.

2. The method of claim 1 including after storing the indication, establishing a connection with the server computer system.

3. The method of claim 2 wherein the connection is established with a point-to-point transmission mechanism.

4. The method of claim 1 wherein when the stored indication is not present, sending an indication that the client computer system has not received any broadcasted data to the server computer system via the established connection.

5. The method of claim 1 wherein the server computer system resends the broadcasted data using the broadcast transmission mechanism.

6. The method of claim 1 wherein the server computer system resends the broadcasted data using the established connection.

7. A method for ensuring receipt of data that is broadcast from a server computer system and received by a plurality of client computer systems, the server computer system having a broadcast transmission mechanism for transmitting data unidirectionally from the server computer system to the client computer systems, each client computer system having an identity and a broadcast receiver for receiving data broadcast by the broadcast transmission mechanism, the method comprising:

broadcasting the data using the broadcast transmission mechanism;

receiving at each of the plurality of client computer systems, the broadcasted data using the broadcast receiver;

upon receiving the broadcast data at a client computer system, sending a confirmation from the client computer system to the server computer system through a point-to-point transmission mechanism for sending data from client computer system to the server computer system; and upon receiving by the server computer system a confirmation from a client computer system, determining the identity of the client computer system that sent the confirmation; and storing the identity of the client computer system that sent the confirmation so that the identity of a client computer system that did not receive the broadcasted data can be determined.

8. The method of claim 7 including:

upon receiving the broadcasted data at each of the plurality of client computer systems, determining whether the client computer system has a connection established with the server computer system through the transmission mechanism; and when it is determined that no connection has been established, delaying sending the confirmation until a connection is established.

9. A method in a server computer system for transmitting data from the server computer system to a plurality of client computer systems, the method comprising:

broadcasting the data using a unidirectional transmission mechanism so that at least some of the client computer systems receive the data; and for each of the plurality of client computer systems, p2 establishing a connection with the client computer system using a bidirectional transmission mechanism;

determining whether the client computer system has confirmed receipt of the broadcasted data; and when it is determined that the client computer has not confirmed receipt of the broadcasted data, transmitting the data using the bidirectional transmission mechanism to the client computer system.

10. The method of claim 9 wherein when a client computer system receives the broadcasted data, the client computer system sends a confirmation of receipt to the server computer system via the bidirectional transmission mechanism.

11. The method of claim 10 wherein the server computer system determines that a client computer system has not confirmed receipt of the broadcasted data, when the server computer system has not received a confirmation from that client computer system.

12. A computer-readable medium containing instructions for causing a computer system to ensure receipt of data that is broadcast from a server computer system and received by a plurality of client computer systems, the server computer system having a broadcast transmission mechanism for transmitting data unidirectionally from the server computer system to the client computer systems, each client computer system having a broadcast receiver for receiving data broadcast by the broadcast transmission mechanism, by:

broadcasting the data using the broadcast transmission mechanism;

receiving at each of the plurality of client computer systems, the broadcasted data using the broadcast receiver; and upon receiving the broadcasted data at each of the plurality of client computer systems, sending a confirmation from the client computer system to the server computer system through a bidirectional transmission mechanism for sending data between client computer system and the server computer system whereby the server computer system can track the client computer systems that have received the broadcasted data based on the sent confirmations.

13. The computer-readable medium of claim 12 including:

upon receiving the broadcasted data at each of the plurality of client computer systems, determining whether the client computer system has a connection established with the server computer system through the bidirectional transmission mechanism; and when it is determined that no connection has been established, delaying sending the confirmation until a connection is established.

14. A method for downloading data from a server computer system to a plurality of client computer systems, the server computer system having a broadcast transmission mechanism and a point-to-point transmission mechanism, the broadcast transmission mechanism for transmitting data from the server computer system to the client computer system but cannot transmit data from the client computer systems to the server computer system, each client computer system having a broadcast receiver for receiving data broadcast by the broadcast transmission mechanism, the point-to-point transmission mechanism being for transmitting data to and receiving data from each of the plurality of client computer systems, the method comprising:

determining broadcast transmission characteristics for the transmission of the data to be downloaded;

determining point-to-point transmission characteristics for the transmission of download data;

selecting whether to transmit the download data using the broadcast transmission mechanism or using the point-to-point transmission mechanism based on the determined transmission characteristics;

when the broadcast transmission mechanism is selected, broadcasting the data to be downloaded using the broadcast transmission mechanism; and when the point-to-point transmission mechanism is selected, sending the data to be downloaded to each client computer system using the point-to-point transmission mechanism.

15. The method of claim 14 including:

receiving confirmations from client computer systems that received the broadcasted data; and when confirmations have not been received from all the client computer system, transmitting the data to be downloaded to those client computer systems for which a confirmation has not been received using the broadcast transmission mechanism or using the point-to-point transmission mechanism.

16. The method of claim 15 wherein the transmitting of the data to be downloaded to those client computer systems for which a confirmation has not been received is periodically repeated.

17. The method of claim 15 wherein the step of transmitting is periodically repeated until a confirmation from each client computer system is received.

18. The method of claim 15 wherein the step of transmitting is periodically repeated until a time out has occurred.

19. A method in a server computer system for transmitting data to a plurality of client computer systems, the server computer system having a broadcast transmission mechanism and having a point-to-point transmission mechanism, the broadcast transmission mechanism for transmitting data from the server computer system to the client computer system but cannot transmit data from the client computer systems to the server computer system, each client computer system for receiving data transmitted through the point-to-point transmission mechanism, only some of the client computer systems capable of receiving data transmitted through the broadcast transmission mechanism, the method comprising the steps of:

transmitting the data using the broadcast transmission mechanism;

transmitting the data using the point-to-point transmission mechanism to each client computer system that is not capable of receiving the data transmitted through the broadcast transmission mechanism;

receiving a confirmation from each client computer system that received the data transmitted through the broadcast transmission mechanism; and when confirmations have not been received from all the client computer system that are capable of receiving data transmitted through the broadcast transmission mechanism, re-transmitting the data using either the broadcast transmission mechanism or the point-to-point transmission mechanism so that each client computer system that is capable of receiving the data transmitted through the broadcast transmission mechanism receives the transmitted data.

20. A computer-readable medium containing instructions for causing a server computer system to transmit data to a plurality of client computer systems, the server computer system having a broadcast transmission mechanism and having a point-to-point transmission mechanism, the broadcast transmission mechanism for transmitting data from the server computer system to the client computer system but cannot transmit data from the client computer system to the server computer system, each client computer system for receiving data transmitted through the point-to-point transmission mechanism, only some of the client computer systems capable of receiving data transmitted through the broadcast transmission mechanism, by:

transmitting the data using the broadcast transmission mechanism;

transmitting the data using the point-to-point transmission mechanism to each client computer system that is not capable of receiving the data transmitted through the broadcast transmission mechanism;

receiving a confirmation from each client computer system that received the data transmitted through the broadcast transmission mechanism; and when confirmations have not been received from all the client computer system that are capable of receiving data transmitted through the broadcast transmission mechanism, re-transmitting the data using either the broadcast transmission mechanism or the point-to-point transmission mechanism so that each client computer system that is capable of receiving the data transmitted through the broadcast transmission mechanism receives the transmitted data.

21. A computer system for confirming receipt of data broadcast by a server computer system, the broadcasted data being broadcasted using a broadcast transmission mechanism for transmitting data unidirectionally from the server computer system, comprising:

a receiving component that, when the computer system does not have a connection established with the server computer system, receives the broadcasted data and stores an indication that the broadcasted data has been received; and a confirmation component that, when the computer system later establishes a connection with the server computer system, checks for presence of the stored indication that the broadcasted data has been received; and when the stored indication is present, sends a confirmation that the computer system received the broadcasted data to the server computer system using the established connection.

22. The computer system of claim 21 including a connection component that, after storing the indication, establishes a connection with the server computer system.

23. The computer system of claim 22 wherein the connection is established with a point-to-point transmission mechanism.

24. The computer system of claim 21 wherein when the stored indication is not present, the confirmation component sends an indication that the client computer system has not received any broadcasted data to the server computer system via the established connection.

25. The computer system of claim 21 wherein the server computer system resends the broadcasted data using the broadcast transmission mechanism.

26. The computer system of claim 21 wherein the server computer system resends the broadcasted data using the established connection.

\* \* \* \* \*